United States Patent [19]

Nakahara

[11] Patent Number: 4,903,256

[45] Date of Patent: Feb. 20, 1990

[54] CARD INCLUDING ROTATORY SYSTEM OPTICAL RECORDING MEDIUM

[75] Inventor: Takashi Nakahara, Tokyo, Japan

[73] Assignee: Canon Kabushiki Kaisha, Tokyo, Japan

[21] Appl. No.: 110,282

[22] Filed: Oct. 20, 1987

[30] Foreign Application Priority Data

Oct. 23, 1986 [JP] Japan ............................ 61-250702
Mar. 18, 1987 [JP] Japan ............................ 62-061329

[51] Int. Cl.⁴ .............................................. G11B 25/04
[52] U.S. Cl. .................................... 369/291; 206/309; 206/312; 360/133
[58] Field of Search ............... 369/291; 206/309, 444, 206/312, 313; 360/133

[56] References Cited

U.S. PATENT DOCUMENTS

| | | | |
|---|---|---|---|
| 4,239,108 | 12/1980 | Coleman et al. | 369/291 |
| 4,477,894 | 10/1984 | Clurman | 369/291 |
| 4,556,966 | 12/1985 | Bricot et al. | 369/52 |
| 4,627,037 | 12/1986 | Tamaru et al. | 369/291 |
| 4,646,285 | 2/1987 | Ogusu et al. | 369/291 |
| 4,730,292 | 3/1988 | Hasegawa et al. | 369/36 |
| 4,731,776 | 3/1988 | Ishii et al. | 369/291 |

FOREIGN PATENT DOCUMENTS 0064897 11/1982 European Pat. Off. .
2098380 11/1982 United Kingdom .

Primary Examiner—Steven L. Stephan
Attorney, Agent, or Firm—Fitzpatrick, Cella, Harper & Scinto

[57] ABSTRACT

A card including a rotatory system optical recording medium, comprises a rotatory system optical recording medium, a case body having a holding space which holds said optical recording medium freely detachably and a protective cover which protects the surface of said optical recording medium held on said case body, said case body being provided with an opening means for the protective cover so that said optical recording medium can be detached from said holding space.

A recording and/or reproducing device for a card including a rotatory system optical recording medium comprises a means for releasing from a case body a rotatory system optical recording medium held on the case body having a protective cover by utilizing the opening formed by removal of the protective cover, a means for rotating said optical recording medium and a means for returning said optical recording medium to the holding space after recording and/or reproduction.

9 Claims, 4 Drawing Sheets

CARD INCLUDING ROTATORY SYSTEM OPTICAL RECORDING MEDIUM

BACKGROUND OF THE INVENTION

1. Field of the Invention

This invention relates to a card including a rotatory system optical recording medium, particularly to a card having internally a rotatory system optical recording medium which can be used for cash card for bank, chart card for hospital, ROM card for electronic dictionary, etc.

2. Related Background Art

In the prior art, as an information recording medium, a card having a magnetic recording layer on one surface or a card having an optical recording medium adhered in the shape of a tape, etc. has been widely known. Writing and reading of the information in these cards are performed by moving linearly the card relative to the head for reading, but this method is limited in moving speed, and it is difficult to make higher the recording density due to inferior characteristics such as scanning precision, etc.. Further, increase of recording capacity is also limited.

On the other hand, an information recording medium in view of the above drawbacks has been proposed. As a card including a rotatory system optical recording medium in a case body, Japanese Laid-open Patent Publication No. 79581/1985 reports a card which performs recording and reproduction of information by rotating a rotatory system optical recording medium within a flat space, but in view of the state in which the card is carried, when the card is subjected to deformation such as bending, etc., rotation of the recordig medium may become impossible, or irregularity in rotation may occur, whereby stable recording and/or reproduction becomes impossible. Also, in the case of optical recording medium, since recording and/or reproduction are effected through a transparent window, there is involved the drawback that the sensitivity of the medium is susceptible to influence from damage, dust, fingerprints on the surface, etc.

Further, when the case body is desired to be formed to a thickness which is as thin as equal to cash card, magnetic card, etc., the rotatory system optical recording medium must be formed in as thin a plate as possible. Then, the optical path between the surface on the light transmission side and the recording layer becomes short, and therefore there is also involved the drawback that the medium is susceptible to the influence from the medium surface, flaw, dust, contamination, etc. during recording and/or reproduction of signals, whereby stable recording and/or reproduction cannot be performed.

SUMMARY OF THE INVENTION

An object of the present invention is to provide a card including a rotatory system optical recording medium with good portability which can remove the drawbacks of the prior art as described above, can perform stable recording and reproduction of information and also enables high speed access at high density and with large capacity.

More specifically, the present invention is a card including a rotatory system optical recording medium, comprising a rotatory system optical recording medium, a case body having space which holds said optical recording medium freely detachably and a protective cover which protects the surface of said optical recording medium held on said case body, said case body being provided with an opening means for the protective cover so that said optical recording medium can be detached from said holding space.

With said card, it becomes possible to perform recording and/or reproduction of information with said rotatory system optical recording medium being detached from the case body, whereby recording and/or reproduction of information not influenced by deformation of the case body and the protective cover is rendered possible.

Also, the device for recording and/or reproduction of said card according to the present invention is a recording and/or reproducing device for a card including a rotatory system optical recording medium, comprising a means for releasing from a case body a rotatory system optical recording medium held on the case body having a protective cover by utilizing the opening formed by removal of the protective cover, a means for rotating said optical recording medium and a means for returning said optical recording medium to the holding space after recording and/or reproduction.

DETAILED DESCRIPTION OF THE PREFERRED EMBODIMENTS

In the present invention, the case body is provided with a protective cover for protecting the surface of a rotatory system optical recording medium, the case body is also provided with a opening means for the protective cover, and the rotatory system optical recording medium is released from the case body through the opening formed by movement of the protective cover through said opening means and, after recording and reproduction of information are effected, mounted in the holding space of the case body.

The opening means is constituted so that the case body is provided with a guide groove and a protective cover may be slided freely along said guide groove. Also, as another example of the opening means, a supporting rod mounted on the end portion of the upper surface of the case body can be fitted freely rotatably with a protective cover, with said protective cover being freely rocked in the vertical direction relative to the surface of the case body.

Also, in the present invention, the rotatory system optical recording medium can record and/or reproduce information with little influence from dust and flaw attached on the light incident surface as described hereinafter by provision of at least one stepped difference with a distance shorter than the distance from the light incident surface to the recording layer.

Said optical recording medium may be preferably one in which a stepped difference is provided outside the recording region or a stepped difference is preferably formed at the peripheral portion concentrically outside of the recording region on the disc of said optical recording region. Further, said optical recording medium is required to be held by the stepped difference so as to be not dropped off in at least one direction from the case body. The card including a rotatory system optical recording medium constituted as described above performs recording and/or reproduction of information under the state where said optical recording medium is released from the case body and therefore has the following advantages.

(1) Recording and/or reproduction can be effected without influence from deformation of the case body or protective cover during carrying of the card, whereby the case body and the protective cover may have appropriate strength and therefore the thickness of the card can be made thinner to provide a card with good portability.

(2) Said optical recording medium will not be damaged through contact with the case body of the protective cover, and also no friction with the case body will occur, whereby rotation is stabilized to effect recording and/or reproduction at high precision.

Also, during housing in the case body, the medium can be completely protected against mechanical damages from outside or contamination with finger-prints, dust, etc.

Further, when a stepped difference is provided on the rotatory system optical recording medium, it is held on the case body through said stepped difference, and it becomes possible to set the thickness corresponding to the thickness of said case body and the thickness approximate thereto as the thickness of said optical recording medium, whereby the distance from the light incident surface of said optical recording medium to the recording layer becomes greater to enable reduction of the influence on the recording layer surface of dust or flaw attached on the light incident surface during recording and/or reproduction of information to effect stable recording and/or reproduction of information.

The size of the case body may be preferably within the range of 40 to 70 mm in width, 70 to 100 mm in length and 0.5 to 2.0 mm in thickness in view of portability, particularly 49 mm to 59 mm in width, 81 mm to 91 mm in length and 0.5 to 2.0 mm in thickness. On the other hand, the diameter of said optical recording medium may be preferably 10 mm to 70 mm, with the thickness preferably 0.2 mm to 2 mm.

In place of the stepped difference provided on the above rotatory system optical recording medium, taper or a combination of stepped difference with taper may be also provided.

Also, the releasing direction of the rotatory system optical recording medium is not only the upward vertical direction, but also the downward vertical direction when said card is mounted with the opening downward.

The present invention is described in detail below by referring to the drawings.

Figure 1:
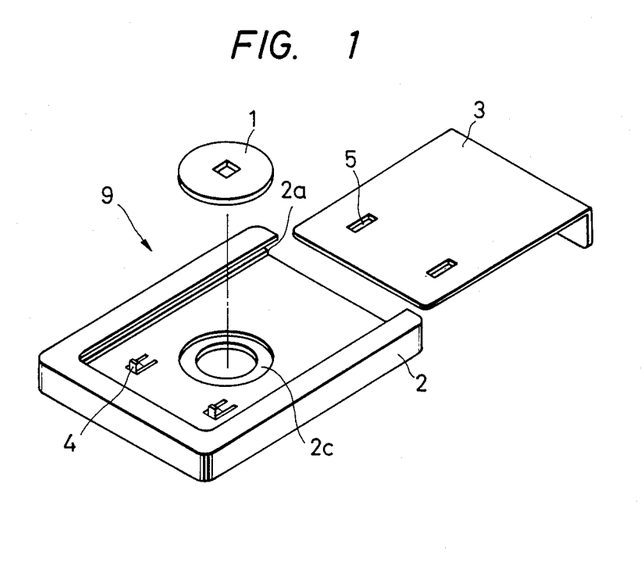
FIG. 1 through FIG. 3 show an example of the card including a rotatory system optical recording medium of the present invention, FIG. 1 being a perspective view showing the constitution of the card, FIG. 2 a sectional view cut in the longitudinal direction of the card, and FIG. 3 a sectional view showing the opened state of the protective cover.
Figure 2:
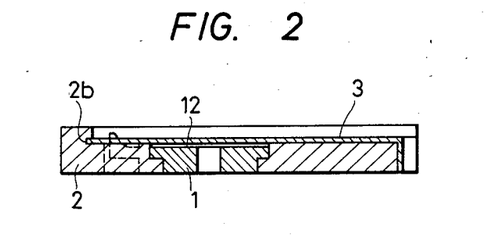
Figure 3:
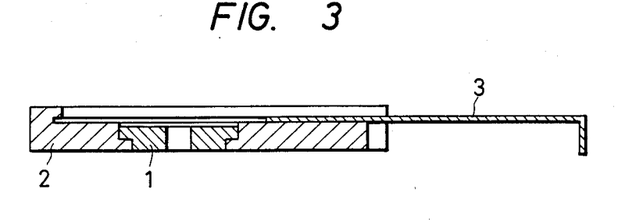

FIG. 1 through FIG. 3 show an example of the present invention, FIG. 1 showing a perspective view representing the constitution of the card, FIG. 2 a sectional view cut in the longitudinal direction of the card and FIG. 3 a sectional cut along the longitudinal direction representing the opened state of the protective cover.

In FIG. 1 and FIG. 2, 1 is a rotatory system optical recording medium internally mounted with an information recording layer, 2 is a case body which holds freely detachably the rotatory system optical recording medium and holds the protective cover 3 freely slidably in the longitudinal direction of card, 3 is a protective cover for protecting the surface layer of the rotatory system optical recording medium 1 housed in the case body 2 and preventing drop-off thereof, 4 is a locking nail for preventing the protective cover 3 from coming off from the case body 2, and 5 is a square hole which is provided on the protective cover 3 and engaged with the locking nail 4.

Said case body and protective layer are prepared with, for example, a polycarbonate resin to sizes of 54 mm in width×86 mm in length×1.5 mm in thickness.

Figure 8:
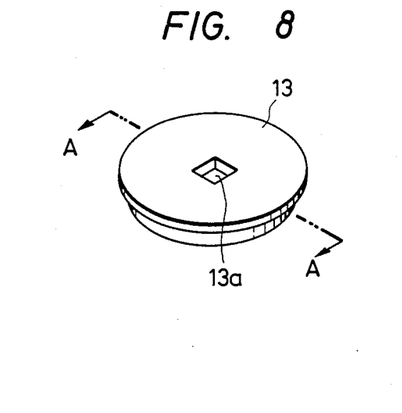
FIG. 8 is a perspective view of a rotatory system optical recording medium.
Figure 9:
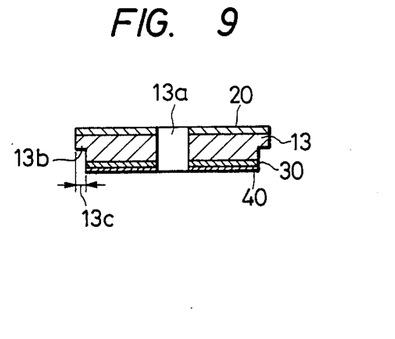
FIG. 9 is a sectional view taken along the line A—A.

On the other hand, the void 12 is provided for prevention of friction between the protective cover 3 and the rotatory system recording medium 1 during opening and closing of the protective cover. FIG. 8 is a perspective view of the rotatory system and FIG. 9 a sectional view taken along the line A—A. Reference numeral 13 constitutes a base stand of the medium 1, which is a substrate formed of an optically transparent material such as polymethyl methacrylate resin, 13a is a guide hole provided on the substrate 13 and engaged with an external driving source, 20 is an optically transparent first protective layer for protection of the surface of the substrate 13, 30 is a recording layer for performing optical recording with photoenergy, 40 is a second protective layer for protecting the recording layer 30. The protective layers 20 and 40 may be formed of, for example, a polycarbonate resin. The recording layer 30 is formed by coating of a polymethine dye to a thickness of 1000 Å. Reference character 13b is a stepped difference for prevention of drop-off from the case body 2 provided concentrically with the recording layer 30 on the substrate 13. The width 13c of said stepped difference is 2 mm. Said optical recording medium was prepared to a diameter of 28 mm and a thickness of 0.75 mm.

In the above constitution, the rotatory system optical recording medium (hereinafter abbreviated as medium) 1 is held as shown in FIG. 2 in the circular holding space 2c provided at a part of the case body 2 and, under the opened state of the protective cover as shown in FIG. 3, formed detachably from the case body 2 by means of a medium rotating means not shown.

The case body 2 holding the medium 1 is provided with a pair of guide grooves 2a, and the protective cover 3 slides internally of the above guide groove 2a and is inserted so as to cover the medium 1 to the terminal end surface 2b of the guide groove 2a. At this time, the square hole 5 provided at the protective cover 3 is engaged with the locking nail 4 formed integrally and resiliently on the case body 2 to fix the protective cover 3, thereby preventing the protective cover 3 from being dropped off unpreparedly from the case body 2.

Figure 10:
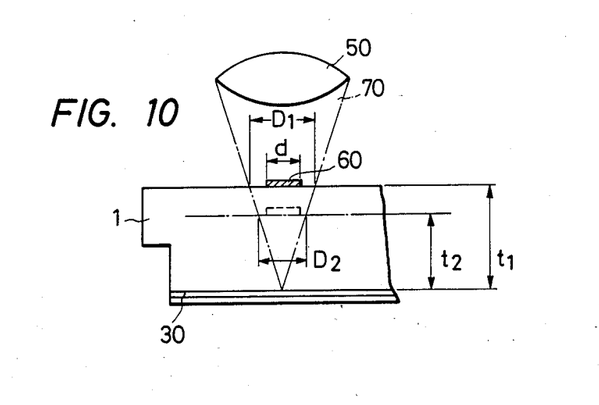
FIG. 10 is a schematic illustration for explanation of the influence of dust and flaw on the rotatory system optical recording medium.

FIG. 10 is a schematic illustration of the influence of dust, flaws on the recorded surface. Reference numeral 50 is a lens for forming fine optical spot on the recording layer 30 by focusing the light beam emitted from a light source (e.g. laser) not shown, 60 is dust attached on the surface of the medium 1, d is the diameter when the dust is supposed to be approximately circular. Each of $t_1$ and $t_2$ is the plate thickness of each medium, indicating the relationship of $t_1 > t_2$, representing the case of a thick medium plate and the case of a thin medium plate.

$D_1$ and $D_2$ are related to $t_1$ and $t_2$, respectively, and the diameter of the light irradiated region formed on the surface with a plate thickness $t_1$ by the conical light beam 70 focused with the lens 50 is represented by $D_1$ and the diameter of the light irradiated region on the surface with the plate thickness $t_2$ by $D_2$.

Next, referring to FIG. 10, the relationship of dust, flaws with plate thicknesses $t_1$, $t_2$ is to be explained. For performing accurate recording on the recording layer 30 with a light beam, the recording layer 30 must be supplied with a predetermined dose, namely photoenergy. Here, if dust having a diameter of d is attached on the surface with a medium plate thicknesses $t_1$ and $t_2$, then the dose reaching the recording layer 30 is proportional to the irradiated areas $S_1$ and $S_2$ on the surface with medium thicknesses $t_1$ and $t_2$ from which the area Sd exclusively occupied by dust is detracted.

Since the relationship of the medium thicknesses $t_1$ and $t_2$ is $t_1 > t_2$, $(S_1 - S_d) > (S_2 - S_d)$, namely $$\pi \frac{D_1^2 - d^2}{4} > \pi \frac{D_2^2 - d^2}{4}$$

whereby the dose reaching the recording layer 30 becomes greater for a medium of thickness t, and such a medium exhibits to have less influence from dust.

On the other hand, the space given exclusively to the medium included in the case body is limited by the dimensions of the case body and, in the circular plate shape shown in the prior art example, particularly the medium thickness cannot be taken sufficiently, and therefore it is susceptible to influence from dust and flaws. However, by providing a stepped difference 13b on the medium 1 as in the present invention, the medium thickness within the case body can be taken sufficiently without affecting other constituent members, whereby the influence by flaws and dust can be excluded.

Also, the stepped difference 13b in the above example is not necessarily circular, but it may be outside the optical recording region and only held on the card-shaped case so as not to be dropped off from at least one direction.

Figure 11:
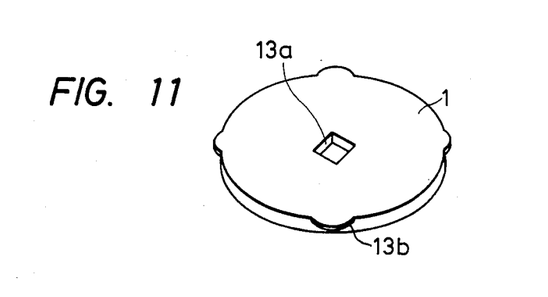
FIG. 11 is a perspective view showing another example of the rotatory optical recording medium.

Next, FIG. 11 shows a modification example of the stepped difference 13b, in which a stepped difference for prevention of drop-off protruded from the outer circumference of the medium 1 is provided.

Figure 4:
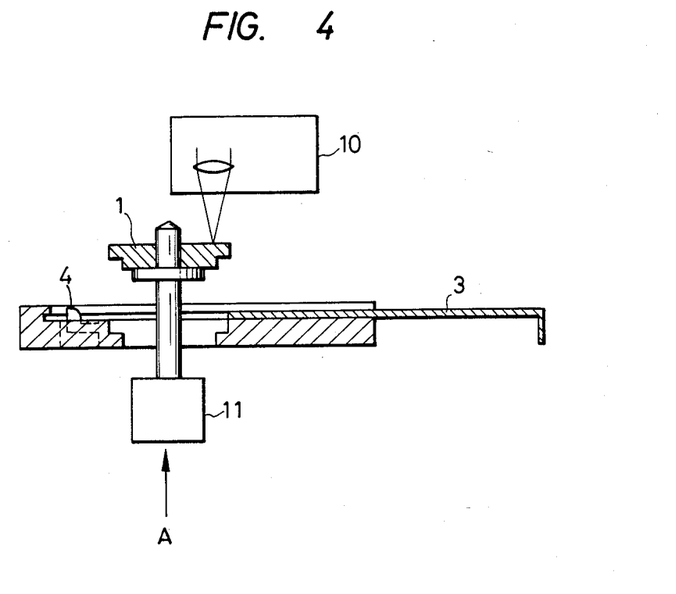
FIG. 4 is an illustration of an example of the recording and/or reproducing means.

In the following, by referring to FIG. 4, a device for performing recording and/or reproduction by use of said card 9 is to be described.

The above card 9 set at a predetermined position of the information recording and/or reproducing device (hereinafter abbreviated as device) (not shown) which releases the locking nail 4 through the locking nail releasing means and the protective cover opening and closing means (not shown) effects opening and closing of the protective cover, whereby the protective cover 3 is opened within the range to such extent that the medium 1 can be taken out by the medium rotating means 11 from the case body 2.

Next, the medium 1 is released by the medium rotating means 11 from the case body 2 and rotated at the position previously set by the device, and recording reproduction of information are effected by the recording and reproducing head 10. Housing on the medium 1 into the case body 2 can be done according to substantially the reverse actuation of the procedure as described above.

Figure 5:
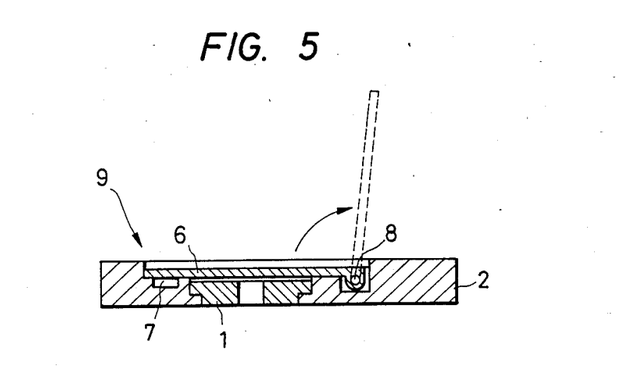
FIG. 5 is a sectional view showing another example of the card of the present invention.

FIG. 5 is a sectional view showing another example of a card 9 including the medium of the present invention, in which the case body 2 is provided with a pin 8 which is the supporting rod, and a door-shaped protective cover 6 is mounted freely rotatably with said pin 8 as the center of rotation, said door-shaped protective cover 6 being provided so as to be capable of forming an opening at least greater than the medium 1.

On the other hand, the door-shaped protective cover 6 is provided at the tip end with a magnet (not shown), and fixed by mutual attraction with the magnet 7 provided on the case body 2 when closed.

The shape of the medium 1 is not particularly limited, but other than the circular shape as shown in FIG. 1, it may be square shape, polygonal shape or ellipsoidal shape, and the case body 2 is not necessarily required to be freely slidable or rotatable with the medium 1 housed in the holding space.

Figure 6:
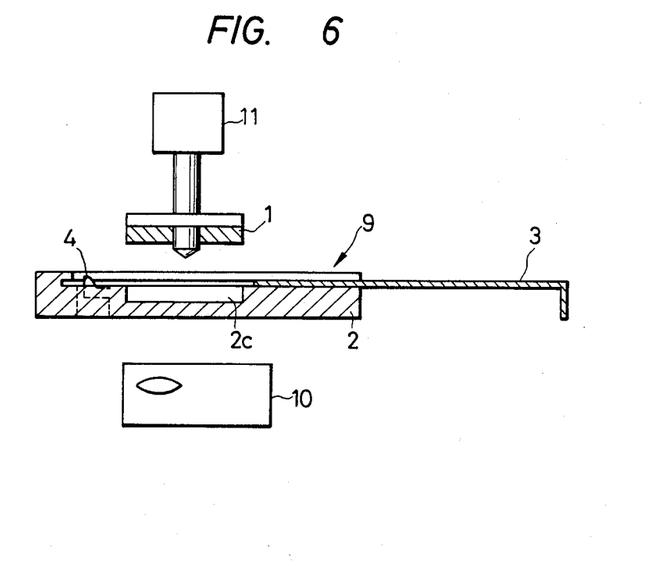
FIG. 6 and FIG. 7 are illustrations showing other examples of recording and reproducing means.
Figure 7:
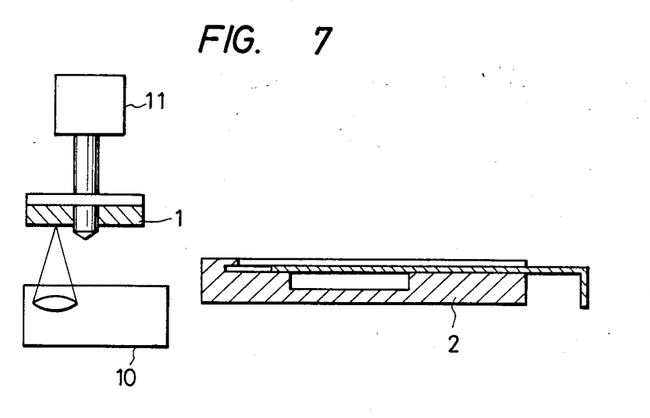

FIG. 6 and FIG. 7 illustrate another example of the recording, reproducing means of the medium 1.

The card 9 constituted of the case body 2 with the lower side of the holding space 2c on the side confronting the protective cover 3 is set at a predetermined position (not shown) and, by actuating the means for releasing the locking nail 4 not shown and the means for closing and opening the protective cover 3, the protective cover 3 is closed within the range in which the medium 1 can be taken out.

Next, by means of the medium rotating means 11, the medium 1 is taken out so as to be released from the case body and rotates as held on a predetermined position. At this time, the recording and reproducing head 10 is set at a position apart from the case body 2. When the medium 1 is taken out from the case body 2, the case body 2 is retracted by means of a case body moving means (not shown) provided within the device to the range in which the recording and reproducing head 10 can be moved to the recording and reproducing position as shown in FIG. 7. Under this state, the recording and reproducing head 10 moves to the recording and reproducing position by means of the head moving means in the device (not shown) to effect recording and reproduction of information on the medium 1.

In this case, since the case body 2 has no opening on the back surface, there is little penetration of dust as compared with the case of the card shown in FIG. 1, and therefore it is also effective in design and as the card.

What is claimed is:

1. A card including a rotatory system optical recording medium, comprising a rotatory optical recording medium, a case body having a holding space which releasably holds said optical recording medium, and a protective cover which protects the surface of said optical recording medium when said optical recording medium is held on said case body, said case body including opening means for the opening protective cover from a first position in which it protects the surface of the optical recording medium to a retracted position in which an opening portion is formed, said optical recording medium being releasable from and returnable to the case body through the opening portion, wherein said opening means comprises a guide groove in which said protective cover can freely slide.

2. A card including a rotatory system optical recording medium, comprising a rotatory optical recording medium, a case body having a holding space which releasably holds said optical recording medium, and a protective cover which protects the surface of said optical recording medium when said optical recording medium is held on said case body, said case body including opening means for opening the protective cover from a first position in which it protects the surface of the optical recording medium to a retracted position in which an opening portion is formed, said optical recording medium being releasable from and returnable to the case body through the opening portion, wherein said opening means comprises a supporting rod fitted with a freely rotatable protective cover.

3. A card including a rotatory system optical recording medium, comprising a rotatory optical recording medium, a case body having a holding space which releasably holds said optical recording medium, and a protective cover which protects the surface of said optical recording medium when said optical recording medium is held on said case body, said case body including opening means for the protective cover from a first position in which it protects the surface of the optical recording medium to a retracted position in which an opening portion is formed, said optical recording medium being releasable from and returnable to the case body through the opening position, wherein at least one stepped difference and/or taper for prevention of drop-off from the case body is provided on a part of the rotatory system optical recording medium.

4. A card including a rotatory system optical recording medium according to claim 3, wherein at least one stepped difference is provided at a distance smaller than the distance from the light incident surface of the rotatory system optical recording medium to the recording layer.

5. A card including a rotatory system optical recording medium according to claim 3, wherein the rotatory system optical recording medium comprises a stepped difference provided outside of the recording region.

6. A card including a rotatory system optical recording medium according to claim 3, wherein the rotatory system optical recording medium is discshaped and comprises a stepped difference at the peripheral portion concentrically with the recording region.

7. A card including a rotatory system optical recording medium, comprising a rotatory optical recording medium, a case body having a holding space which holds said optical recording medium freely detachably, and a protective cover which protects the surface of said optical recording medium held on said case body, said case body being provided with opening means for the protective cover so that said optical recording medium can be detached from said holding space;
    wherein in the rotatory system optical recording medium, said protective cover is held on said case body by having said opening means comprising a freely slidable guide groove provided on the case body, in which the protective cover can be slided freely, the optical recording medium being detachable in the vertical direction of said holding space, and at least one stepped difference being provided on said optical recording medium, the thickness of said step being smaller than the distance from the light incident surface of said optical recording medium to the recording layer.

8. A card including a rotatory system optical recording medium comprising a rotatory optical recording medium, a case body having a holding space which holds said optical recording medium freely detachably, and a protective cover which protects the surface of said optical recording medium held on said case body, said case body being provided with opening means for the prtective cover so that said optical recording medium can be detached from said holding space;
    wherein at least one stepped difference and/or taper for prevention of drop-off from the case body is provided on a part of the rotatory optical recording medium;
    wherein in the rotatory system optical recording medium, said protective cover is held on said case body by having said opening means comprising a freely slidable guide groove provided on the case body, in which the protective cover can be slided freely, the optical recording medium being detachable in the vertical direction of said holding space, and at least one stepped difference being provided on said optical recording medium, the thickness of said step being smaller than the distance from the light incident surface of said optical recording medium to the recording layer.

9. A card including a rotatory system optical recording medium, comprising a rotatory optical recording medium, a case body having a holding space which releasably holds said optical recording medium, and a protective cover which protects the surface of said optical recording medium when said optical recording medium is held on said case body, said case body including opening means for the protective cover from a first position in which it protects the surface of the optical recording medium to a retracted position in whicn an opening portion is formed, said optical recording medium being releasable from and returnable to the case body through the opening portion, wherein the card has a locking means for the protective cover which is released when being set on the recording and/or reproducing device and said opening means comprising a supporting rod fitted freely rotatably with said protective cover.

* * * * *

UNITED STATES PATENT AND TRADEMARK OFFICE
CERTIFICATE OF CORRECTION

PATENT NO. : 4,903,256

DATED : February 20, 1990

INVENTOR(S) : Takashi Nakahara

Page 1 of 3

It is certified that error appears in the above-identified patent and that said Letters Patent is hereby corrected as shown below:

ON THE TITLE PAGE

FOREIGN PATENT DOCUMENTS

Insert --60-79581 5/1985 Japan--.

COLUMN 1

Line 23, "increase" should read --an increase--; and
Line 34, "recordig" should read --recording--.

COLUMN 2

Line 42, "line A — A" should read --line A — A shown in FIG. 8--; and
Line 54, "a" should read --an--.

COLUMN 4

Line 9, "sectional" should read --sectional view--; and
Line 16, "of card," should read --of the card,--.

UNITED STATES PATENT AND TRADEMARK OFFICE
CERTIFICATE OF CORRECTION

PATENT NO. : 4,903,256

DATED : February 20, 1990

INVENTOR(S) : Takashi Nakahara

It is certified that error appears in the above-identified patent and that said Letters Patent is hereby corrected as shown below:

COLUMN 5

Line 3, "fine optical spot" should read --a fine optical spot--;
Line 27, "detracted." should read --subtracted.--;
Line 37, "to have" should be deleted; and
Line 65, "means" should read --means,--.

COLUMN 6

Line 5, "recording" should read --recording and/or--;
Line 7, "on" should read --of--;
Line 35, "not shown" should read --(not shown)--; and
Line 68, "the opening" should read --opening the--.

COLUMN 7

Line 35, "position," should read --portion,--; and
Line 51, "discshaped" should read --disc-shaped--.

UNITED STATES PATENT AND TRADEMARK OFFICE
CERTIFICATE OF CORRECTION

PATENT NO. : 4,903,256

DATED : February 20, 1990

INVENTOR(S) : Takashi Nakahara

Page 3 of 3

It is certified that error appears in the above-identified patent and that said Letters Patent is hereby corrected as shown below:

COLUMN 8

Line 17, "medium" should read --medium,--;
    Line 23, "prtective" should read --protective--; and
    Line 50, "whicn" should read --which--.

Signed and Sealed this

Thirtieth Day of June, 1992

Attest:

DOUGLAS B. COMER

Attesting Officer

Acting Commissioner of Patents and Trademarks